(12) United States Patent
Loga

(10) Patent No.: US 8,127,792 B2
(45) Date of Patent: Mar. 6, 2012

(54) PRESSURE EQUALIZATION SYSTEM FOR A BI-DIRECTIONAL ORIFICE FITTING

(75) Inventor: Thomas Henry Loga, Sugar Land, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 888 days.

(21) Appl. No.: 12/182,894

(22) Filed: Jul. 30, 2008

(65) Prior Publication Data
US 2010/0024884 A1    Feb. 4, 2010

(51) Int. Cl.
*F16C 1/00* (2006.01)
(52) U.S. Cl. .......... 137/599.13; 137/601.18; 137/625.41
(58) Field of Classification Search ............. 137/601.18, 137/599.09, 599.11, 599.13, 115.09, 2, 8, 137/115.01, 115.03, 110, 315.01, 625.4, 137/625.41, 625.46, 602, 605; 251/117, 251/118, 127; 138/44
See application file for complete search history.

(56) References Cited

U.S. PATENT DOCUMENTS

| | | | |
|---|---|---|---|
| 2,044,806 A * | 6/1936 | Naiman ..................... 73/203 |
| 3,596,680 A * | 8/1971 | Adams ...................... 137/637 |
| 4,343,193 A * | 8/1982 | Dawson et al. ............ 73/861.61 |
| 4,396,036 A * | 8/1983 | Horikawa et al. ......... 137/625.41 |
| 5,209,258 A * | 5/1993 | Sharp et al. ................ 137/343 |
| 5,464,036 A | 11/1995 | Tomkins et al. |
| 5,836,356 A * | 11/1998 | Desai .......................... 138/44 |
| 6,216,736 B1 * | 4/2001 | Benedetti ................ 137/625.47 |
| 6,871,666 B1 | 3/2005 | Loga et al. |
| 7,255,129 B2 * | 8/2007 | Lopez ..................... 137/625.46 |

FOREIGN PATENT DOCUMENTS
JP    60209116 A    10/1985

OTHER PUBLICATIONS

PCT/US2009/052038 International Search Report and Written Opinion, Mar. 18, 2010.

* cited by examiner

*Primary Examiner* — Craig Schneider
*Assistant Examiner* — Seth Faulb
(74) *Attorney, Agent, or Firm* — Conley Rose, P.C.

(57) ABSTRACT

A pipeline flow meter orifice fitting includes a first body, a flow bore through the first body, a chamber in the first body adjacent to the flow bore, an orifice plate supported in alignment with the flow bore by an orifice plate carrier, wherein the orifice plate carrier is exposed to the chamber and divides the flow bore into a first region to one side of the orifice plate and a second region to the other side of the orifice plate, a second body coupled to said first body, a first flow path fluidicly coupling the first region and the chamber through the second body, and a second flow path fluidicly coupling the second region and the chamber through the second body. In some embodiments, a three way valve is mounted on the first body, the three way valve selectably actuatable to open a first flow path between the first region and the chamber or a second flow path between the second region and the chamber.

19 Claims, 6 Drawing Sheets

PRESSURE EQUALIZATION SYSTEM FOR A BI-DIRECTIONAL ORIFICE FITTING

BACKGROUND

This disclosure relates generally to orifice fittings for measuring fluid flow rates through pipes or other conduits. More particularly, the disclosure relates to a pressure equalization system for use in orifice fittings.

In pipeline operations and other industrial applications, flow meters are used to measure the volumetric flow rate of a gaseous or liquid flow stream moving through a piping section. Flow meters are available in many different forms. One common flow meter is an orifice meter, which includes an orifice fitting connected to the piping section. The orifice fitting serves to orient and support an orifice plate that extends across the piping section perpendicular to the direction of the flow stream. The orifice plate is generally a thin plate that includes a circular opening, or orifice, that is typically positioned concentric with the flow stream.

In operation, when the flow stream moving through the piping section reaches the orifice plate, the flow is forced through the orifice, thereby constricting the cross-sectional flow area of the flow. Due to the principles of continuity and conservation of energy, the velocity of the flow increases as the stream moves through the orifice. This velocity increase creates a pressure differential across the orifice plate. The measured differential pressure across the orifice plate can be used to calculate the volumetric flow rate of the flow stream moving through the piping section.

A dual chamber orifice fitting embodies a special design that enables the orifice plate to be removed from the fitting without interrupting the flow stream moving through the piping section. This specially designed fitting has been known in the art for many years. U.S. Pat. No. 1,996,192 was issued in 1934 and describes an early dual chamber orifice fitting. Fittings with substantially the same design are still in use in many industrial applications today. Although the design has remained substantially unchanged, operating conditions continue to expand and dual chamber fittings are now available for a wide range of piping sizes and working pressures.

A cross-sectional view of common dual chamber orifice fitting 12 is illustrated in FIG. 1. Orifice fitting 12 includes body 16 and top 18. Body 16 encloses lower chamber 20, which is in fluid communication with the bore 34 of a pipeline. Top 18 encloses upper chamber 22 and is connected to body 16 by bolts 17. Aperture 30 defines an opening connecting upper chamber 22 to lower chamber 20. Valve seat 24 is connected to top 18 by bolts 28 and provides a sealing engagement with slide valve plate 56, which is slidably actuated by rotating gear shaft 54. Lower drive 36 and upper drive 38 operate to move orifice plate carrier 32 vertically within bore 34 and fitting 12 between lower chamber 20 and upper chamber 22. Orifice plate carrier 32 can be removed from fitting 12 through upper chamber 22 by loosening bolts 46, which engage locking bar 44 to compress sealing bar 40 and sealing gasket 42 against top 18. Orifice plate carrier is thus selectably disposable between the fully seated position in bore 34 and the upper portions of fitting 12.

In operation, as shown in FIG. 1, aperture 30 is closed by slide valve plate 56 hydraulically isolating upper chamber 22 and lower chamber 20. Pressurized fluid flow in bore 34 passes through orifice 52, which is located on an orifice plate 50 supported by orifice plate carrier 32 that sealingly engages the wall of bore 34. Pressure up and downstream of orifice plate 50 is measured via meter tap holes or communication ports 66. The measured pressure differential across orifice plate 50 is then used to estimate the rate of fluid flow through fitting 12. In order to obtain accurate estimates of the flow rate through fitting 12, all of the flow moving through the pipeline must pass through orifice 52. If any flow by-passes or flows around orifice 52, an error in the measurement of the pressure differential across orifice plate 50 occurs. To prevent flow from bypassing orifice 52, a seal 64 is placed around orifice plate 50, between plate 52 and carrier 32.

When lower chamber 20 has a lower pressure than bore 34, the pressure in bore 34 will tend to urge orifice plate carrier 32 upward and into lower chamber 20, potentially causing misalignment between orifice 52 and bore 34 that can decrease measurement accuracy. Further, seal 64, which is usually constructed from an elastomer or polymer, may fail due to the pressure differential between bore 34 and lower chamber 20. In order to counter the pressure differential, an equalization flow path or weephole 60 is included between lower chamber 20 and bore 34. Weephole 60 provides fluid communication between bore 34 and lower chamber 20, and thus, allows pressure to equalize across orifice plate carrier 32. Weephole 60 is located upstream of orifice 52 so as to be located in the region of highest pressure within bore 34.

In some applications, such as metering for bulk storage facilities, it may be desirable to be able to operate an orifice fitting with flow in either direction through the fitting, in order to measure the alternating flow into and out of the facility. However, if weephole 60 is positioned downstream from orifice 52, the pressure in bore 34 proximate weephole 60 will be less than the pressure in bore 34 that acts on orifice plate carrier 32, thereby creating a pressure differential across carrier 32 and urging carrier 32 into lower chamber 20. Further, seal 64 may tend to expand radially off of orifice plate 50. Once seal 64 is compromised in this manner, pressure differential measurement accuracy is lost.

To enable the measurement of fluid passing through a fitting in either direction, the weephole may be sealed by welding, and a bypass system coupled to the fitting. In some configurations, the bypass system, which replaces the weephole, includes two tubes. One tube is coupled between a meter tap hole to one side of the orifice plate and the lower chamber, while the other tube is coupled between a meter tap hole to the other side of the orifice plate and the lower chamber. A valve is positioned along each tube to permit or prevent fluid flow therethrough.

In operation, the valve positioned along the tube coupled to the upstream meter tap hole is open, while the other valve is closed. Some pressurized fluid passes from the bore through the upstream tube into the lower chamber to provide pressure equalization between the lower chamber and the bore of the fitting upstream of the orifice plate. Thus, the upstream tube of the bypass system performs the same function as a weephole in a uni-directional fitting. Pressure differential measurements may be taken across the orifice plate, as described above.

When the direction of flow through the bi-directional fitting is reversed, the position of each valve is also reversed. What was previously the upstream valve, now the downstream valve, is closed. Similarly, what was previously the downstream valve, now the upstream valve, is opened. With the valve positions reversed and the upstream tube again performing the function of a weephole, pressure differential measurements may be taken across the orifice plate with flow passing through the fitting but in the opposite direction.

While these types of bypass systems offer a means for converting a fitting from uni-directional to bi-directional, these bypass systems are not without their shortcomings. The individual components of the bypass system are costly and can be difficult to install. Once installed, these systems often leak. Since the bypass system is external to the fitting, the tubing and valves are vulnerable to surrounding conditions. An inadvertent impact to the tubing and/or valves, e.g., during transport of the fitting, may cause damage to the bypass system.

Therefore, there remains a need in the art for a bi-directional dual chamber orifice fitting that provides pressure equalization across the orifice plate carrier while overcoming these and certain other limitations of the prior art.

SUMMARY

The disclosure includes methods and apparatus for a bi-directional dual chamber orifice fitting comprising a first body, a flow bore through the first body, a chamber in the first body adjacent to the flow bore, an orifice plate supported in alignment with the flow bore by an orifice plate carrier, wherein the orifice plate carrier is exposed to the chamber and divides the flow bore into a first region to one side of the orifice plate and a second region to the other side of the orifice plate, a second body coupled to said first body, a first flow path fluidicly coupling the first region and the chamber through the second body, and a second flow path fluidicly coupling the second region and the chamber through the second body. In some embodiments, fluid flow through the flow bore in a first direction will flow through the first flow path but not the second flow path. A fluid flow through the flow bore in the opposite direction will flow through the second flow path but not the first flow path.

In some embodiments, a method for equalizing the pressure on an orifice plate carrier disposed within a flow bore through an orifice fitting and exposed to a chamber within the orifice fitting adjacent the flow bore comprises flowing a fluid through the flow bore in a first direction, equalizing a pressure between a first upstream region of the flow bore and the chamber through a first flow path in the body, flowing the fluid through the flow bore in an opposite direction of the first direction, actuating a second flow path in the body, and equalizing a pressure between a second upstream region of the flow bore and the chamber through the second flow path.

In further embodiments, an orifice fitting comprises a first body having a flow bore therethrough and a chamber disposed therein adjacent the flow bore, an orifice plate supported in alignment with the flow bore by an orifice plate carrier, wherein the orifice plate carrier is exposed to the chamber and divides the flow bore into a first region to one side of the orifice plate and a second region to the other side of the orifice plate, and a three way valve mounted on the first body, the three way valve selectably actuatable to open a first flow path between the first region and the chamber or a second flow path between the second region and the chamber.

Thus, the embodiments of the disclosure comprise a combination of features and advantages that enable substantial enhancement of the operation of dual chamber orifice fittings. These and various other characteristics and advantages of the disclosure will be readily apparent to those skilled in the art upon reading the following detailed description and by referring to the accompanying drawings.

BRIEF DESCRIPTION OF THE DRAWINGS

For a more detailed understanding, reference is made to the accompanying Figures, wherein.

DETAILED DESCRIPTION

Figure 1:
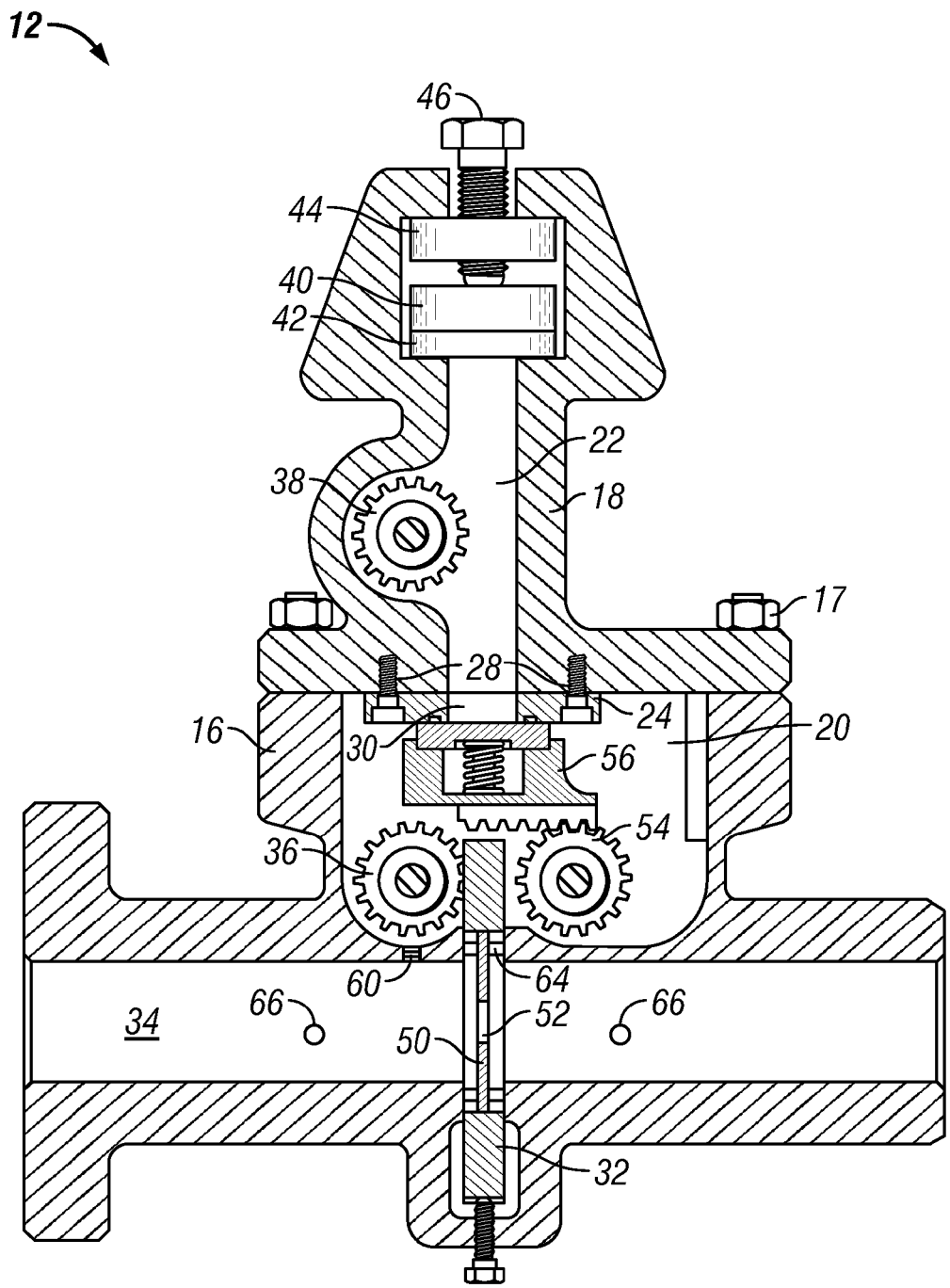
FIG. 1 is a cross-sectional view of a dual chamber orifice fitting.

In the drawings and description that follow, like parts are typically marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below may be employed separately or in any suitable combination to produce desired results.

Unless otherwise specified, any use of any form of the terms "connect", "engage", "couple", "attach", or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". The various characteristics mentioned above, as well as other features and characteristics described in more detail below, will be readily apparent to those skilled in the art upon reading the following detailed description of the embodiments, and by referring to the accompanying drawings.

Figure 2:
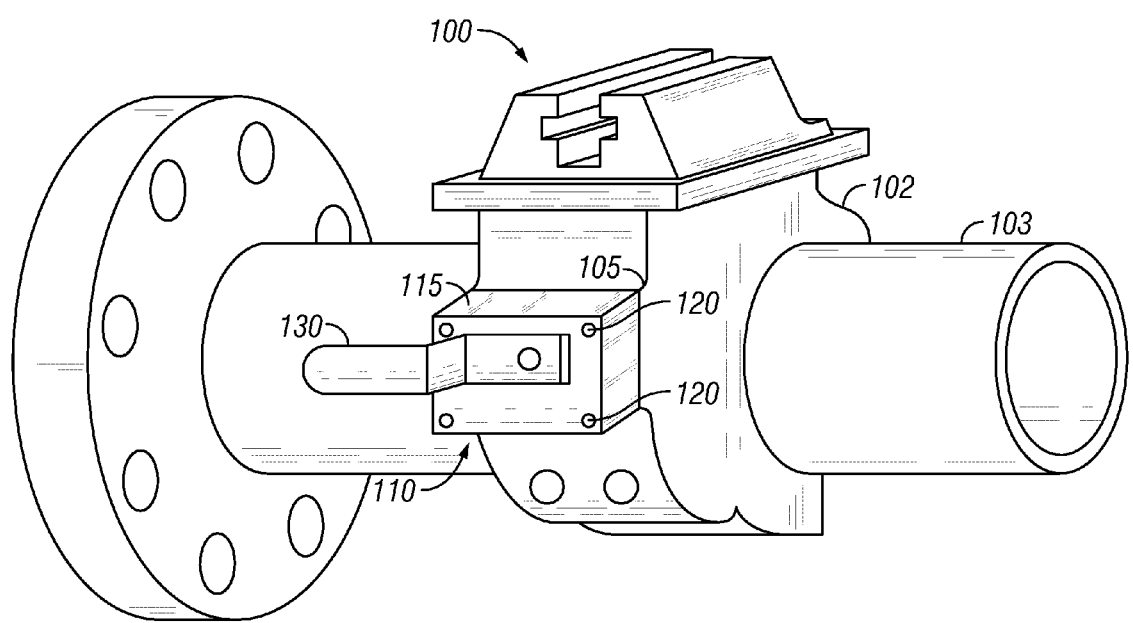
FIG. 2 is a perspective view of a bi-directional orifice fitting with a pressure equalization system in accordance with the principles disclosed herein.

Referring now to FIG. 2, a perspective view of an orifice fitting 100 coupled to a pipeline 103 is shown. Orifice fitting 100 includes a body 102 having a meter tap boss 105. A pressure equalization system 110 is coupled to body 102 at boss 105. Pressure equalization system 110 may also be referred to as a bypass system. Bypass system 110 includes a body or block 115 through which one or more bolts 120 extend to couple block 115 to body 102 of fitting 100. Bypass system 110 further includes a valve 125 (visible in FIG. 3) disposed within block 115. A handle 130 is coupled to valve 125 and is selectably moveable to change the position of valve 125. In this exemplary embodiment, valve 125 is actuated by manually moving handle 130 from one position to another. In other embodiments, however, valve 125 may be actuated in other ways known in the art, including but not limited by electrical means.

Figure 3:
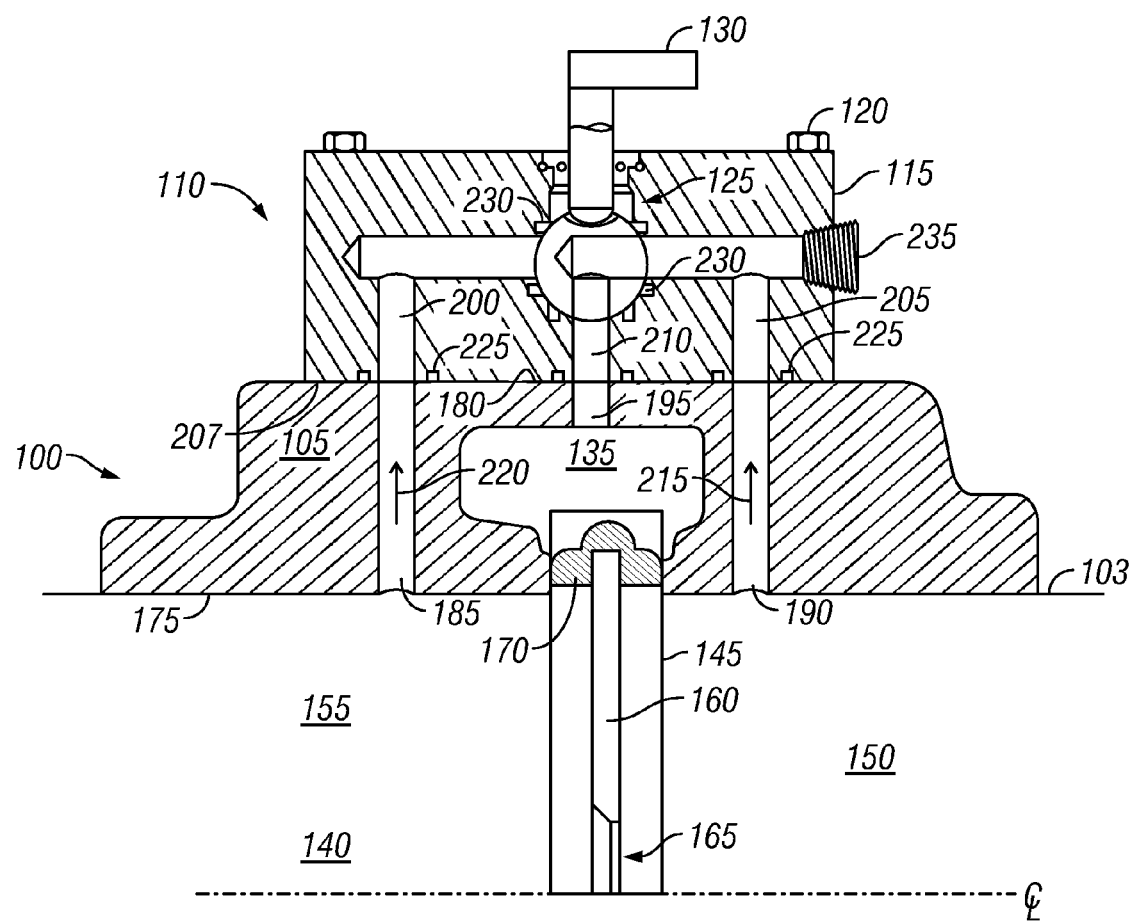
FIG. 3 is a partial cross-sectional view of the bi-directional orifice fitting of FIG. 2 with the pressure equalization system coupled thereto.

Referring now to FIG. 3, a cross-section of bypass system 110 coupled to orifice fitting 100 is shown. Meter tap boss 105 of orifice fitting 100 includes a lower chamber 135, which is in fluid communication with a flow bore 140 of pipeline 103. An orifice plate carrier 145 is disposed within flow bore 140, thereby dividing flow bore 140 into a first region 150 and a second region 155. Plate carrier 145 includes an orifice plate 160 with an orifice 165 therethrough and a seal 170 surrounding plate 160 and carrier 145.

Meter tap boss 105 of fitting 100 further includes an inner surface 175, an outer surface 180, two meter tap holes 185, 190 extending therebetween, and a flow bore 195 extending between outer surface 180 and lower chamber 135. Meter tap holes 185, 190 are positioned on opposite sides of orifice plate 160 and configured to permit the measurement of fluid pressure within flow bore 140. Outer surface 180 is configured to engage block 115 of bypass system 110. In some embodiments, body 102 and boss 105 are cast or machined to create outer surface 180 such that outer surface 180 may sealingly engage block 115. In other embodiments, body 102 and block 115 are manufactured as integral components, or as a uniform body including the components of block 115 as described herein.

As described above, valve 125 of bypass system 110 is seated within block 115. In this exemplary embodiment, valve 125 is a rotatable valve, including but not limited to a ball valve. Handle 130 is coupled to valve 125 and is selectably moveable to vary the position of valve 125. Bypass system 110 further includes three flow bores 200, 205, 210 extending between valve 125 and an inner surface 207 of block 115. Inner surface 207 is configured to engage boss 105 of fitting 100. In some embodiments, block 115 is cast or machined to create inner surface 207 such that inner surface 207 may sealingly engage fitting 100 when installed thereon. In other embodiments, fitting 100 and block 115 are manufactured as integral components, or as a uniform body including the components of block 115 as described herein. When block 115 is installed on fitting 100, as shown in FIG. 3, flow bores 200, 205 align with meter tap holes 185, 190, respectively. Also, flow bore 210 aligns with flow bore 195 of fitting 100.

Depending on the position of valve 125, a flow path may be opened from flow bore 140 of pipeline 103 through meter tap boss 105 of fitting 100 and block 115 of bypass system 110 to lower chamber 135. When valve 125 assumes a first position, as shown, a first flow path 215 is opened and extends from first region 150 of flow bore 140 through meter tap hole 190, flow bore 205, valve 125, flow bore 210 and flow bore 195 to lower chamber 135. When valve 125 assumes a second position (shown in FIG. 6), a second flow path 220 is opened and extends from second region 155 of flow bore 140 through meter tap hole 185, flow bore 200, valve 125, flow bore 210 and flow bore 195 to lower chamber 135. Valve 125 is selectably actuated by rotation of handle 130 to open first flow path 215 and simultaneously close second flow path 220, or vice versa. By virtue of the communicating flow bores and selectively useable flow paths just described, valve 125 may also be referred to as a three way valve. First flow path 215 provides a selectively useable fluidic coupling between first region 150 and chamber 135 through body 115, and second flow path 220 provides another selectively useable fluidic coupling between second region 155 and chamber 135 also through body 115.

To prevent the loss of fluid from fitting 100 and bypass system 110, bypass system 110 further includes a plurality of sealing elements 225 disposed between block 115 of bypass system 110 and meter tap boss 105 of fitting 100 surrounding the junctions between flow bore 200 and meter tap hole 185, between flow bore 210 and flow bore 195, and between flow bore 205 and meter tap hole 190. Bypass system 110 further includes a plurality of sealing elements 230 at the junctions between valve 125 and flow bores 200, 205, 210. Lastly, bypass system 110 further includes a plug 235. Plug 235 in inserted into block 115 after flow bores 200, 205 are manufactured.

Figure 4A:
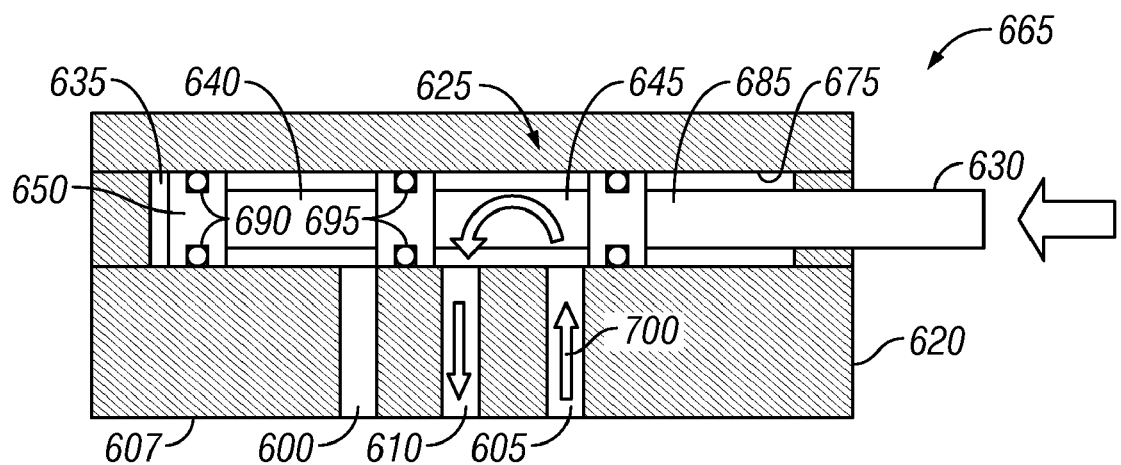
FIGS. 4A and 4B are cross-sectional views of another embodiment of a pressure equalization system with a slidable valve.

As described above, in this exemplary embodiment, bypass system 110 includes rotatable valve 125. Other embodiments of a pressure equalization system may include another type of valve. By way of example, FIG. 4A depicts a bypass system 665 including a slidable valve 625. Bypass system 665 includes a block 620 which may be coupled to boss 105 of fitting 100 (FIG. 2). Block 620 includes a cavity 635 therein, which is bounded by a surface 675. Valve 625 is disposed within cavity 635 and slidably engages surface 675 of block 620. A handle 630 is coupled to valve 625 and is selectably moveable to vary the position of valve 625 within cavity 635. Block 620 further includes three flow bores 600, 605, 610 extending between valve 625 and an inner surface 607 of block 620. Inner surface 607 is configured to engage boss 105 of fitting 100 (FIG. 2). In some embodiments, block 620 is cast or machined to create inner surface 607 such that inner surface 607 may sealingly engage fitting 100 when installed thereon. When block 620 is installed on fitting 100, flow bores 600, 605 align with meter tap holes 185, 190, respectively. Also, flow bore 610 aligns with flow bore 195 of fitting 100.

Valve 625 includes an elongate member 685 having projections 650 forming two chambers 640, 645 inside cavity 635. Handle 630 is coupled to member 685. Each projection 650 includes a groove 690 disposed therein. Each groove 690 is configured to receive a sealing element 695 prior to insertion of valve 625 within block 620. When valve 625 is slidably disposed within cavity 635, as shown, elements 695 enable sealing engagement between valve 625 and block 620.

Figure 4B:
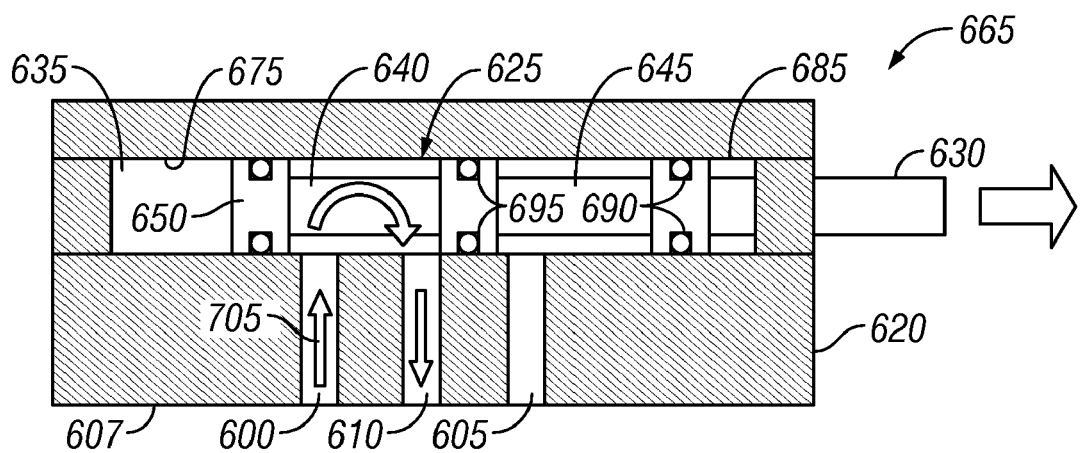

Depending on the position of valve 625, a flow path may be opened from flow bore 140 of pipeline 103 through meter tap boss 105 of fitting 100 and block 620 of bypass system 665 to lower chamber 135. When valve 625 assumes a first position, as shown, a first flow path 700 is opened and extends from first region 150 of flow bore 140 through meter tap hole 190, flow bore 605 of valve 625, chamber 645, flow bore 610 and flow bore 195 of body 105 to lower chamber 135. When valve 625 assumes a second position, as shown in FIG. 4B, a second flow path 705 is opened and extends from second region 155 of flow bore 140 through meter tap hole 185, flow bore 600 of valve 625, chamber 640, flow bore 610 and flow bore 195 of body 105 to lower chamber 135. Valve 625 is selectably actuated by translation of handle 630 to open first flow path 700 and simultaneously close second flow path 705, or vice versa. By virtue of the selectively useable flow paths 700, 705, valve 625 may also be referred to as a three way valve. Flow paths 700, 705 provide separate fluidic couplings between regions 150, 155 and chamber 135 through body 620.

During operation of orifice fitting 100, fluid may pass through flow bore 140 of pipeline 103 in either direction. Depending on the direction of flow, either bypass system 110, 665 is actuated to provide a flow path between flow bore 140 upstream of orifice plate 160 and lower chamber 135. By opening such a flow path, some fluid is allowed to pass from the upstream side of flow bore 140 into lower chamber 135. As a result, pressures loads acting on orifice plate carrier 145, orifice plate 160, and orifice plate seal 170 may be substantially equalized.

Figure 5:
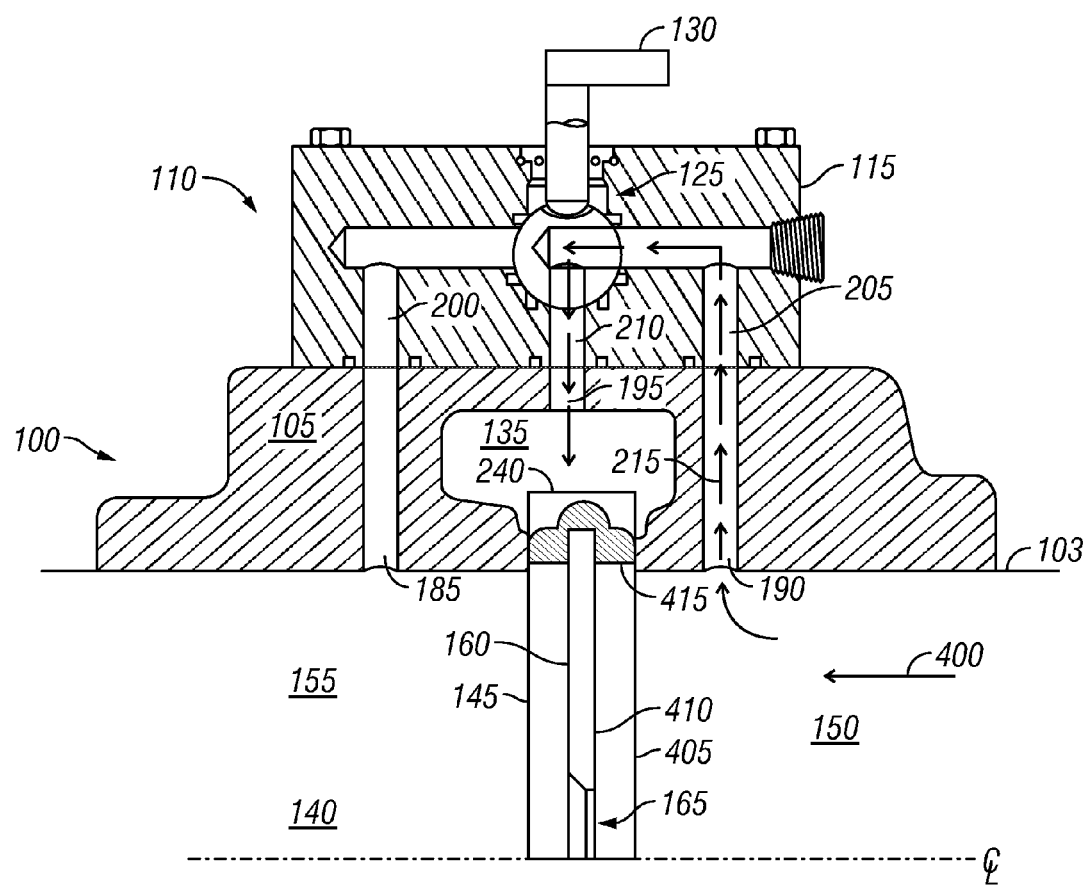
FIG. 5 is a partial cross-sectional view of the bi-directional orifice fitting of FIG. 3 showing flow in a first direction.

For example, referring to FIG. 5, a cross-section of bypass system 110 coupled to orifice fitting 100 is shown with fluid flowing through fitting 100 in the direction 400 indicated. As shown, fluid flows from first region 150 through orifice 165 to second region 155. By virtue of the flow direction 400, first region 150 is the upstream region of flow bore 140, while second region 155 is the downstream region of flow bore 140.

To provide pressure equalization between upstream region 150 and lower chamber 135, handle 130 is rotated to actuate valve 125 such that first flow path 215 is opened and second flow path 220 is closed. As a result, a portion of fluid passing through flow bore 140 of pipeline 103 is diverted from upstream region 150 along first flow path 215 to lower chamber 135. Thus, the pressure of fluid acting on an outer surface 240 of orifice plate carrier 145 is substantially equalized or balanced with the pressure of fluid acting on upstream faces 405, 410, 415 of orifice plate carrier 145, plate 160 and seal 170, respectively.

Figure 6:
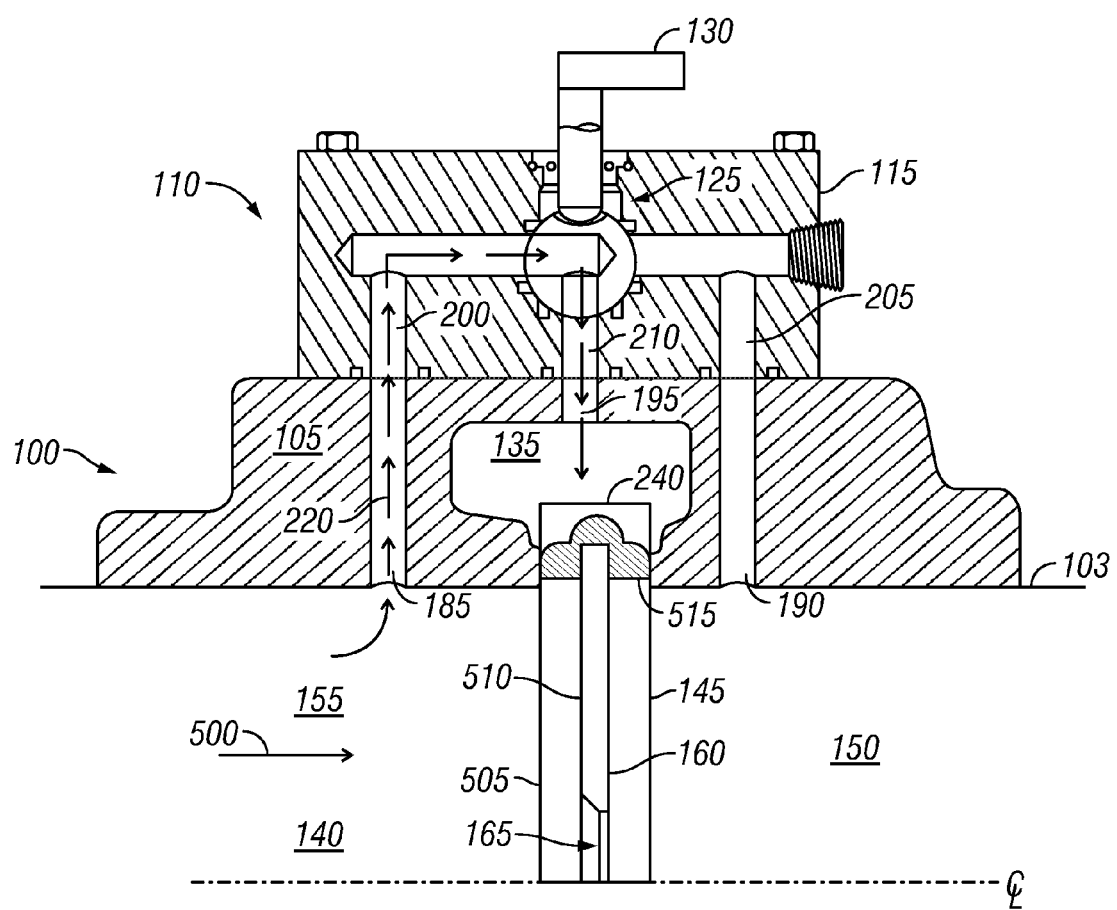
FIG. 6 is a partial cross-sectional view of the bi-directional orifice fitting of FIG. 3 showing flow in a second direction.

Alternatively, referring to FIG. 6, a cross-section of bypass system 110 coupled to orifice fitting 100 is shown with fluid flowing through fitting 100 in the opposite direction, or in the direction 500 indicated. As shown, fluid flows from second region 155 through orifice 165 to first region 150. By virtue of the flow direction 500, second region 155 is the upstream region of flow bore 140, while first region 150 is the downstream region of flow bore 140. To provide pressure equalization between upstream region 155 and lower chamber 135, handle 130 is rotated to actuate valve 125 such that second flow path 220 is opened and first flow path 215 is closed. As a result, a portion of fluid passing through flow bore 140 of pipeline 103 is diverted from upstream region 155 along second flow path 220 to lower chamber 135. Thus, the pressure of fluid contained within lower chamber 135 and acting on outer surface 240 of orifice plate carrier 145 is substantially equalized or balanced with the pressure of fluid acting on upstream faces 505, 510, 515 of orifice plate carrier 145, plate 160 and seal 170, respectively.

As described, with fluid passing through flow bore 140 of pipeline 103 in either direction, valve 125 of bypass system 110 may be actuated to open a flow path between the upstream region of flow bore 140 and lower chamber 135. By opening such a flow path, some fluid is allowed to pass from the upstream region of flow bore 140 (region 150 of FIG. 5; region 155 of FIG. 6) into lower chamber 135. Thus, pressure of fluid contained within lower chamber 135 and acting on outer surface 240 of orifice plate carrier 145 can be controllably and substantially equalized or balanced with the upstream pressure regardless of the fluid flow direction.

The equalization of pressure acting on orifice plate carrier 145, plate 160 and seal 170 enables the radial position of plate carrier 145 to remain unchanged, and the eccentricity of orifice 165 to be maintained. Further, the equalization of pressure acting on seal 170 promotes the structural integrity of seal 170 and minimizes any tendency for seal 170 to displace. Promoting the eccentricity of orifice 165 and eliminating leakage by supporting seal 170 both enable accuracy of differential pressure measurements across orifice plate 160. Thus, by providing a pressure equalization flow path on either side of orifice 165, fitting 100 can be operated to obtain accurate flow estimates with fluid moving in either direction through pipeline 103.

While certain embodiments have been shown and described, modifications thereof can be made by one skilled in the art without departing from the scope or teaching herein. The embodiments described herein are exemplary only and are not limiting. Many variations and modifications of the system and apparatus are possible and will become apparent to those skilled in the art once the above disclosure is fully appreciated. For example, the relative dimensions of various parts, the materials from which the various parts are made, and other parameters can be varied. Furthermore, the flow paths between the pipeline bore through the fitting and equalization pressure system to the lower chamber of the fitting may vary in shape and orientation. Accordingly, it is intended that the following claims be interpreted to embrace all such variations and modifications.

What is claimed is:

1. An orifice fitting comprising:
    a first body;
    a flow bore through the first body;
    a chamber in the first body adjacent to the flow bore;
    an orifice plate supported in alignment with the flow bore by an orifice plate carrier, wherein the orifice plate carrier is exposed to the chamber and divides the flow bore into a first region to one side of the orifice plate and a second region to the other side of the orifice plate;
    a second body coupled to said first body;
    a first flow path fluidicly coupling the first region and the chamber through the second body; and
    a second flow path fluidicly coupling the second region and the chamber through the second body.

2. The orifice fitting of claim 1, wherein fluid flow through the flow bore in a first direction will flow through the first flow path but not the second flow path.

3. The orifice fitting of claim 1, wherein the first and second flow paths are defined by a plurality of throughbores, each throughbore extending through one of the first body and the second body.

4. The orifice fitting of claim 1, further comprising a valve disposed in the second body between the first and second flow paths.

5. The orifice fitting of claim 4, wherein the valve is actuatable to allow one of fluid communication between the first region and the chamber or fluid communication between the second region and the chamber.

6. The orifice fitting of claim 1, wherein the second body is a block having a valve disposed between flow bores coupled to flow bores in the first body.

7. The orifice fitting of claim 6, wherein the valve is actuatable to connect a first set of flow bores to establish the first flow path and to connect a second set of flow bores to establish the second flow path.

8. The orifice fitting of claim 1, further comprising a three way valve disposed in the second body.

9. The orifice fitting of claim 8, wherein the three way valve selectively actuates the first and second flow paths.

10. The orifice fitting of claim 1, wherein the first body and the second body are configured to sealingly engage each other.

11. A method for equalizing the pressure on an orifice plate carrier disposed within a flow bore through an orifice fitting and exposed to a chamber within the orifice fitting adjacent the flow bore, the method comprising:
    coupling a body to the orifice fitting;
    flowing a fluid through the flow bore in a first direction;
    equalizing a pressure between a first upstream region of the flow bore and the chamber through a first flow path in the body;
    flowing the fluid through the flow bore in an opposite direction of the first direction;
    actuating a second flow path in the body; and
    equalizing a pressure between a second upstream region of the flow bore and the chamber through the second flow path.

12. The method of claim 11, further comprising a valve disposed in the body and coupled between the first and second flow paths.

13. The method of claim 12, wherein the actuating step includes actuating the valve to close the first flow path and open the second flow path.

14. The method of claim 11, wherein the body is a block including a three way valve adapted to actuate between a first position opening the first flow path and closing the second flow path, and a second position opening the second flow path and closing the first flow path.

15. The method of claim 11, further comprising continually opening either the first flow path or the second flow path in the body to equalize the pressure between either the first upstream region or the second upstream region and the chamber.

16. An orifice fitting comprising:
   a first body having a flow bore therethrough and a chamber disposed therein adjacent the flow bore;
   an orifice plate supported in alignment with the flow bore by an orifice plate carrier, wherein the orifice plate carrier is exposed to the chamber and divides the flow bore into a first region to one side of the orifice plate and a second region to the other side of the orifice plate; and
   a second body coupled to the first body, the second body comprising a three way valve mounted on the first body, the three way valve selectably actuatable to open a first flow path through the second body between the first region and the chamber or a second flow path through the second body between the second region and the chamber.

17. The orifice fitting of claim 16, wherein the second flow path is closed when the first flow path is open and wherein the first flow path is closed when the second flow path is open.

18. The orifice fitting of claim 16, wherein the second body comprises a plurality of flow bores coupled to a plurality of flow bores in the first body to establish the first and second flow paths.

19. The orifice fitting of claim 16, wherein when one of the first and second flow paths is open, the pressure of fluid in the chamber acting on the orifice plate carrier is substantially balanced by the pressure of fluid acting on an upstream face of the orifice plate.

* * * * *